Figure 1:
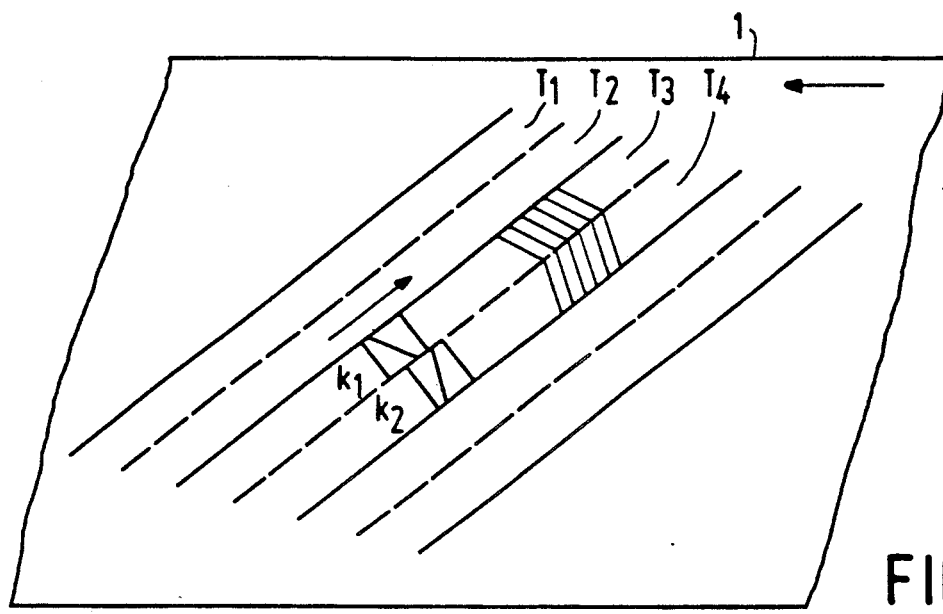

United States Patent [19]

Kahlman

[11] Patent Number: 5,083,227
[45] Date of Patent: Jan. 21, 1992

[54] ARRANGEMENT FOR REPRODUCING AN ELECTRIC SIGNAL

[75] Inventor: Josephus A. H. M. Kahlman, Eindhoven, Netherlands

[73] Assignee: U.S. Philips Corporation, New York, N.Y.

[21] Appl. No.: 468,517

[22] Filed: Jan. 23, 1990

[30] Foreign Application Priority Data

Feb. 13, 1989 [NL] Netherlands ............ 8900340

[51] Int. Cl.[5] ............ G11B 5/584; G11B 5/592
[52] U.S. Cl. ............ 360/77.13; 360/77.12; 369/44.26
[58] Field of Search ............ 360/77.12, 77.13; 369/44.26, 44.37, 44.41

[56] References Cited

U.S. PATENT DOCUMENTS 4,237,500 12/1980 Sanderson ............ 360/77.14
4,868,692 9/1989 Nakase et al. ............ 360/77.13

FOREIGN PATENT DOCUMENTS 2064830 6/1981 United Kingdom ............ 360/77.12

Primary Examiner—Aristotelis Psitos
Assistant Examiner—David L. Robertson

[57] ABSTRACT

In order to achieve tracking in an arrangement for reproducing an electric signal, in particular a digital signal, from a track of a record carrier (1), the arrangement comprises a generator device (25) for deriving a control signal ($C_s$). This control signal is applied to positioning means (8). Under the influence of this control signal the positioning means can position the read units (magnetic heads $K_1$, $K_2$) relative to the tracks ($T_3$, $T_4$) to be read by these heads. The generator device (25) is constructed in such a way that it is possible to derive a control signal ($C_2$) from the information read from the tracks by the heads ($K_1$, $K_2$) without tracking signals being recorded in the tracks.

4 Claims, 2 Drawing Sheets

ARRANGEMENT FOR REPRODUCING AN ELECTRIC SIGNAL

The invention relates to an arrangement for reproducing an electric signal, in particular a digital electric signal, from a track on a record carrier, comprising a read device for reading the electric signal from the track, which read device comprises at least one pair of read units and has a first and a second output for supplying a first and a second signal component read from a first and a second track respectively on the record carrier by the read units of a pair, a generator device, having a first and a second input coupled to the first and the second output respectively of the read device, and having an output, which generator device is constructed to derive a control signal from the first and second signal component applied to its first input and its second input respectively, and to apply the control signal to its output, positioning means for adjusting the relative position of a pair of read units in a direction transverse to the tracks under the influence of the control signal, and means having an input coupled to the output of the generator device, a pair of read units being mechanically coupled to one another.

The invention also relates to a generator device for use in the reproducing arrangement. The reproducing arrangement of the type defined in the opening paragraph is known from the publication "An experimental digital video recording system" by L.M.H.E. Driessen et al., in IEEE Trans. on CE, Vol. CE-32, No. 3, August 1986, p. 3629-70.

Said system relates to the reproduction of a digital video signal by means of a helical scan recorder. The read device comprises at least one pair of read heads arranged on a rotatable head drum. Each read head reads a signal from tracks which are inclined relative to the longitudinal direction of the record carrier, in this case a magnetic tape.

For an optimum positioning of the read heads of the tracks to be read during reproduction use is made of a dynamic tracking system. For this purpose a pair of read heads is arranged on an associated piezoelectric actuator. In accordance with this known tracking system tracking tones are added to the information to be recorded in the recording mode. During reproduction the position of a pair of read heads relative to the tracks to be read by these heads is derived from the crosstalk of the tracking tones from adjacent tracks. It is possible, indeed to derive from this crosstalk signal a control signal which is a measure of the positional error. By feeding back this control signal to the actuators the tracking error can be reduced.

It is also possible to achieve tracking by controlling the capstan by means of the control signal derived from the crosstalk signal. The pair of read units (read heads) is now arranged stationarily and by controlling the speed of transport of the record carrier the pair of heads can be positioned precisely relative to the tracks to be read.

During reproduction of the digital electric signal the signal being read may sometimes contain a substantial distortion component. It is an object of the invention to provide an arrangement by means of which distortion component can be eliminated at least largely.

To this end the arrangement in accordance with the invention is characterized in that the first and the second input of the generator device are coupled to an input of a first and of a second level detector respectively, in that an output of the first level detector is coupled to first inputs of a first and a second multiplier unit, in that an output of the second level detector is coupled to first inputs of a third and a fourth multiplier unit, in that the first input of the generator device is coupled to second inputs of the first and the fourth multiplier unit, in that the second input of the generator device is coupled to second inputs of the second and the third multiplier unit, in that an output of the third and the fourth multiplier unit is coupled to a first and a second input respectively of a signal-combination unit, in that an output of the first and the second signal-combination unit is coupled to a first and a second input respectively of a third signal-combination unit, which unit has an output coupled to the output of the generator device. The invention is based on the recognition of the fact that the distortion component is caused by the presence of the tracking signals in the signal being read. The inventive step now enables a tracking system to be realized without tracking tones being contained in the recorded information. In accordance with the invention a control signal which can be used for tracking is now derived from the recorded information itself. This is possible because there is (substantially) no correlation between the information recorded in adjacent tracks.

Figure 2:
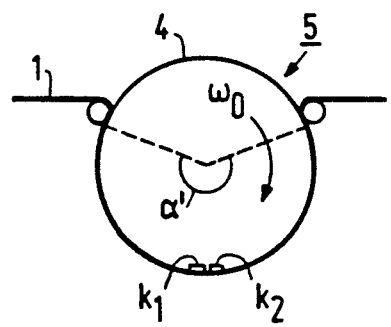
Figure 3:
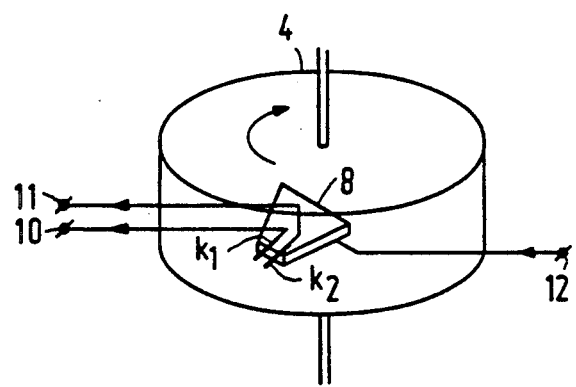
Figure 5:
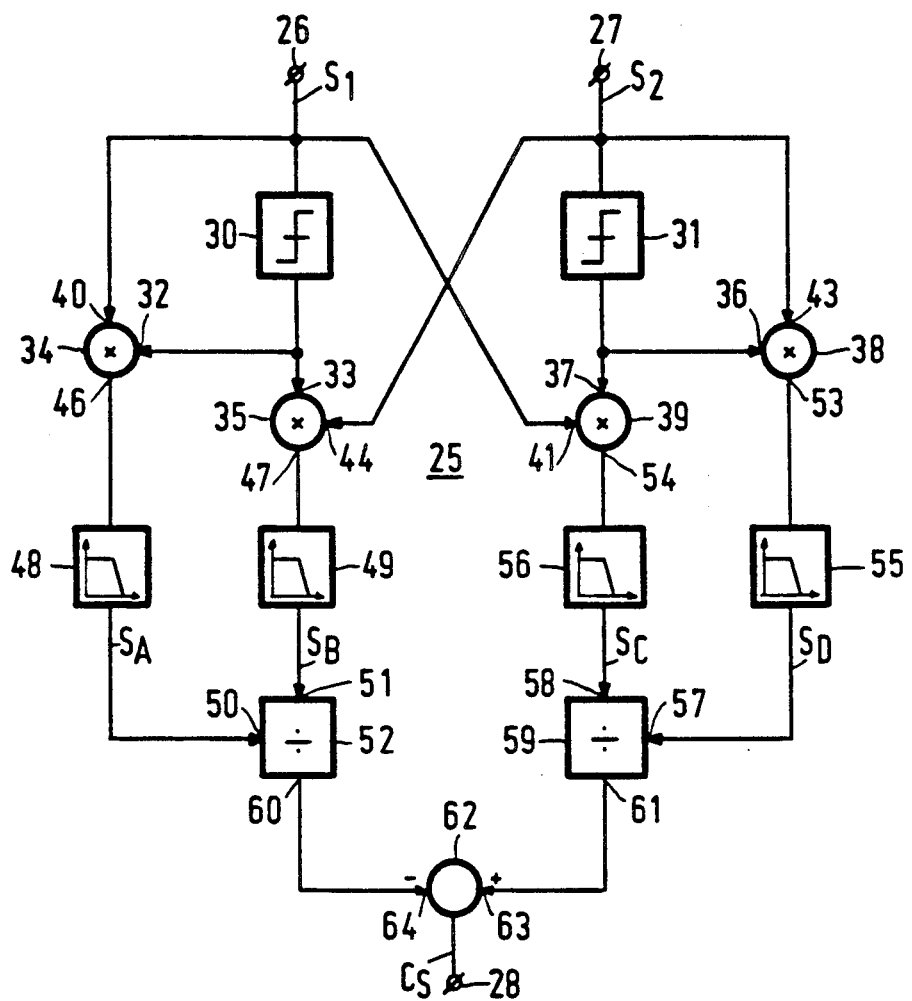
Figure 6:
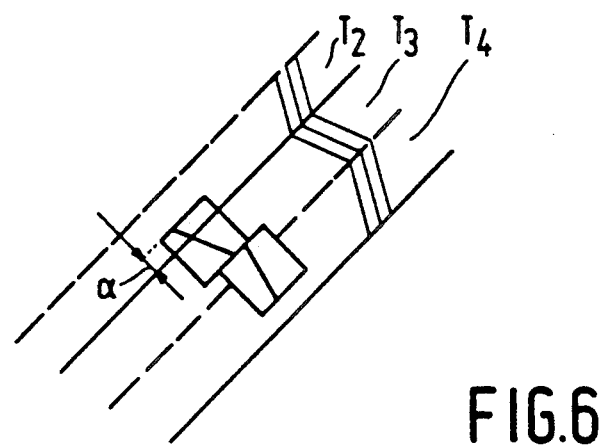

Some embodiments of the invention will now be described in more detail, by way of example, with reference to the accompanying drawing. In the drawing FIG. 1 shows a record carrier with a plurality of tracks being scanned by a pair of reproducing heads, FIG. 2 shows the read device in the form of a pair of reproducing heads arranged on a rotatable head drum, FIG. 3 is a perspective view of the read device, FIG. 4 shows the reproducing arrangement, FIG. 5 shows the generator device used in the reproducing arrangement shown in FIG. 4, and FIG. 6 shows the read heads which are slightly displaced in a direction transverse to the tracks on the record carrier.

FIG. 1 shows a record carrier 1 having a plurality of tracks $T_1, T_2, T_3, \ldots$ etc. which are inclined relative to the longitudinal direction of the record carrier 1. The read device 5, see FIG. 2, takes the form of a rotatable head drum 4 comprising a pair of read units (read heads) $K_1$ and $K_2$ arranged on a positioning element 8 in the form of a piezoelectric actuator 8, see FIG. 3. The record carrier 1 is wrapped around the head drum 4 over a specific angle $\alpha'$. The read heads $K_1$ and $K_2$ have a mechanically rigid coupling with each other and read a pair of tracks more or less concurrently. In FIG. 1 these are the tracks $T_3$ and $T_4$. The heads $K_1$ and $K_2$ have mutually different azimuth angles. The signal read from the tracks by the heads is applied to the outputs 10 and 11, see FIG. 3. A control signal is applied to the input 12. This signal serves for controlling the actuator in such a way that tracking can be achieved.

Figure 4:
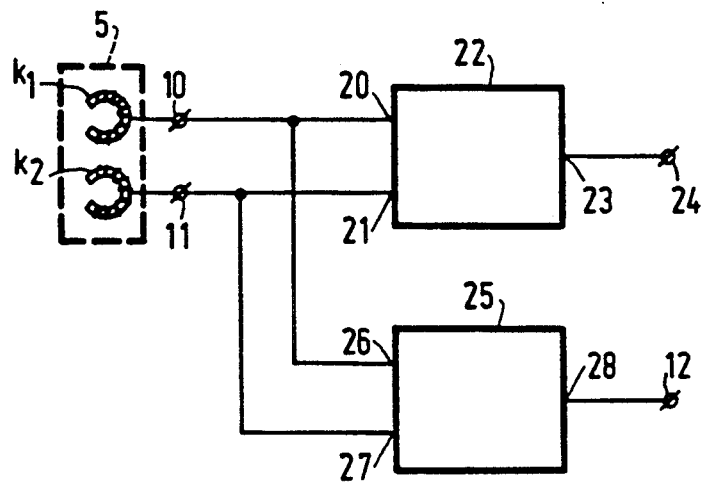

FIG. 4 shows an arrangement for reproducing a digital electric signal. The read device 5 comprising the two read heads $K_1$ and $K_2$ is coupled to inputs 20 and 21 of a signal procesing unit 22 by way of the outputs 10 and 11. The signal-processing unit is constructed to combine the digital information read from the tracks by the two read heads so as to obtain a (digital) electric output signal, which can be applied to the output 23. This output 23 is coupled to an output terminal 24. If the signal recorded on the record carrier 1 is a digital video signal, the signal applied to the output terminal 24 may be an analog video signal. If the signal recorded on the record carrier 1 is a digital audio signal, for example a digital audio signal recorded in accordance with the RDAT standard, the signal applied to the output terminal 24 may be an analog audio signal. Since the invention does not relate to the exact construction of the signal-processing unit 22, this unit 22 will not be described in further detail. However, it is to be noted that the signal processing techniques used therein are known and will not present any problems to those skilled in the art.

The apparatus further comprises a generator device 25 having a first and a second input 26, 27 coupled to the output 10 and 11 respectively of the read device 5. An output 28 of the device 25 is coupled to the input 12 of the positioning means 8, see FIG. 3.

FIG. 5 shows an embodiment of the generator device 25. The input 26 is coupled to an input of a level detector 30. The input 27 is coupled to an input of a level detector 31. The level detectors are constructed to supply an output signal having a first or a second value depending on whether the input signal exceeds or does not exceed a specific threshold value. Such a level detector is very suitable, for example, for use in the case of "integrated detection." This means that the differentiating action of the head is cancelled. In that case integrators are arranged in the connections between the outputs 10 and 11 of the read device 5 and the inputs 26 and 27 of the generator device. If no integrators are arranged in the connection the level detector may have two threshold values. The output signal of the level detectors is then trivalent. It is obvious that the detectors 30 and 31 in the generator device 25 may be combined with the data detectors in the signal-processing unit 22.

The output of the level detector 30 is coupled to first inputs 32, 33 of a first and a second multiplier unit 34 and 35 respectively. The output of the level detector 31 is coupled to first inputs 36, 37 of a third and a fourth multiplier unit 38 and 39 respectively. The input 26 is coupled to second inputs 40, 41 of the multiplier units 34 and 39 respectively. The input 27 is coupled to second inputs 43, 44 of the multiplier units 38 and 35 respectively. The outputs 46 and 47 of the multiplier units 35 and 36 are coupled to inputs 50 and 51 of a signal-combination unit 52 by way of averagers 48 and 49 respectively in the form of low-pass filters.

Similarly, the outputs 53 and 54 of the multiplier units 38 and 39 respectively are coupled to inputs 57 and 58 of a signal-combination unit 59 by way of averagers 55 and 56, respectively which also take the form of low-pass filters. The outputs 60 and 61 of the signal-combination units 52 and 59 are coupled to inputs of a third signal-combination unit 62, which has an output coupled to the output 28. The signal-combination units 52 and 59 are signal dividers. They divide the signal applied to the respectively inputs 51 and 58 by the signal applied to the inputs 50 and 57 respectively. The signal-combination unit 62 is a signal subtractor circuit. The signal applied to the input 64 is a subtracted from the signal applied to the other input 63.

The circuit shown in FIG. 5 operates as follows. It is assumed that the head pair $K_1$, $K_2$ in FIG. 1 is displaced slightly in a direction transverse to the tracks, namely by the $\alpha$-th part of the width of a track, see FIG. 6. If $\alpha = 0$ this means that the head pair will be positioned exactly on the associated tracks $T_3$ and $T_4$. If $\alpha = 0.5$ the head pair has moved to the left (or to the right) by a distance exactly equal to half the track width.

The signals $S_1$ and $S_2$ read from the tracks by the heads $K_1$ and $K_2$ respectively may then be defined as follows.

$$S_1 = \beta \alpha \cdot t_2 + (1-\alpha) t_3 \quad (1)$$

$$S_2 = \beta \alpha \cdot t_3 + (1-\alpha) t_4 \quad (2)$$

In these formulas $\beta$ represents the additional attenuation of the information read from the track $T_2$ (or $T_3$) by the head $K_1$ (or $K_2$) as a result of the fact that this head has a gap whose azimuth angle is not in conformity with the relevant track. The signals $t_2$ and $t_4$ are the signals read by the head $K_2$ if this head does not exactly follow the tracks $T_2$ and $T_4$ respectively. The signal (signal amplitude) read by the head $K_1$ if this head exactly follows the track $T_3$ is referred to as $t_3$.

The signals $S_1$ and $S_2$ are applied to the inputs 26 and 27 of the generator unit 25. Now the level detectors 30 and 31 operate in such a way that if the input signal is $S_1$ or $S_2$ respectively the respective output signals are close approximations to the signals $t_3$ and $t_4$. The output signals are referred to as $t_{3g}$ and $t_{4g}$.

Then the signal $S_1 \cdot t_{3g}$ will appear on the output 46 of the multiplier 34. The signal $S_2 \cdot t_{3g}$ will appear on the output 47 of the multiplier 35. On the output 54 of the multiplier 39 the signal $S_1 \cdot t_{4g}$ is obtained and on the output 53 of the multiplier 38 the signal $S_2 \cdot t_{4g}$ is obtained.

The averagers 48, 49, 55 and 56 perform a low-pass filtration upon the signals whose appearing on the outputs 46, 47, 53 and 54 of the signal-combination units 34, 35, 38 and 39. This results in signals which may be defined as follows (see FIG. 5):

$$S_A = <S_1 \cdot t_{3g}>$$

$$S_B = <S_2 \cdot t_{3g}>$$

$$S_C = <S_1 \cdot t_{4g}>$$

$$S_D = <S_2 \cdot t_{4g}>$$

The output signal of the unit 52 is now $$<S_2 \cdot t_{3g}> / <S_1 \cdot t_{3g}> \quad (3)$$

and the output signal of the unit 59 is then $$<S_1 \cdot t_{4g}> / <S_2 \cdot t_{4g}> \quad (4)$$

The control signal $C_s$ on the output 28 of the signal-combination unit 62 then becomes:

$$C_s = <S_1 \cdot t_{4g}> / <S_2 \cdot t_{4g}> - <S_2 \cdot t_{3g}> / <S_1 \cdot t_{3g}> \quad (5)$$

Inserting formulas (1) and (2) into formula (5) yields the following equation $$C_s = <\beta \alpha t_2 \cdot t_{4g} + (1-\alpha) t_3 \cdot t_{4g}> / \\ <\beta \alpha t_3 \cdot t_{4g} + (1-\alpha) t_4 \cdot t_{4g}> - <\beta \alpha t_3 \cdot t_{3g} + (1 - \alpha) t_4 \cdot t_{3g}> / <\beta \alpha t_2 t_{3g} + (1-\alpha) t_3 \cdot t_{3g}>$$

This equation may be reduced to $$.C_s = <t_3 \cdot t_{4g}> / <(1-\alpha) t_4 \cdot t_{4g}> - <\beta \alpha t_3 \cdot t_{3g} + t_4 \cdot t_{3g}> / <(1-\alpha) t_3 \cdot t_{3g}>$$

Here, use is made of the fact that there is (substantially) no correlation between the information in the adjacent tracks. This means that the terms $\alpha\beta t_2.t_{4g}$, $\alpha\beta t_3.t_{4g}$, $\alpha\beta t_2.t_{3g}$, $\alpha t_3.t_{4g}$ and $\alpha t_4.t_{3g}$ are negligible in comparison with the other terms.

The equation can be simplified even further and is then reduced to $C_s = -\beta\alpha/(1-\alpha)$. This demonstrates that the control signal $C_s$ is a measure of the deviation $\alpha$ of the head pair relative to the tracks to be read. Therefore, this control signal $C_s$ may be used as a control signal for tracking purposes.

It is to be noted that the invention has been described hereinbefore for an arrangement for reproducing a signal from a magnetic record carrier. However, it is obvious that the invention also applies to an arrangement in which the signal is read from an optical record carrier. In that case the read device comprises a pair of light beams with which the signals can be read from two adjacent tracks. Further it is to be noted that the generator devices as described with reference to FIG. 5 may be integrated and may, for example, be incorporated in a microprocessor. The invention also applies to reading by means of stationary heads. An example of this may be a reproducing arrangement in accordance with the SDAT standard.

It is to be noted also that the generator device should process signals from adjacent tracks (more or less) concurrently in order to obtain a useful control signal. This follows in fact directly from equations (1) and (2). This does not automatically imply that the two read units (reproducing heads) should also read the two adjacent tracks more or less concurrently. Moreover, it is also possible to arrange the two reproducing heads in such a way that they are spaced apart by an integral number of times the track pitch. In that case a delay means should be arranged in one of the two connections from the outputs 10 and 11 of the read device 5 to the inputs 26 and 27 respectively of the generator device 25, see FIG. 4, which delay means has such a delay time that the signals read from the two adjacent tracks are applied substantially concurrently to the inputs 26 and 27. This is on the assumption that the tracking errors vary substantially periodically with the tracks, which is actually the case in helical-scan recorders.

I claim:

1. An arrangement for reproducing an electric signal, in particular a digital electric signal, from a track on a record carrier, comprising a read device for reading the electric signal from the track, which read device comprises at least one pair of read units and has a first and a second output for supplying a first and a second signal component read from a first and a second track respectively on the record carrier by the read units of a pair, a generator device, having a first and a second input coupled to the first and second output respectively of the read device, and having an output, which generator device is constructed to derive a control signal from the first and the second signal component applied to its first input and its second input respectively, and to apply the control signal to it output, positioning means for adjusting the relative position of a pair of read units in a direction transverse to the tracks under the influence of the control signal, said means having an input coupled to the output of the generator device, a pair of read units being mechanically coupled to one another, characterized in that the first and the second input of the generator device are coupled to an input of a first and of a second level detector respectively, in that an output of the first level detector is coupled to first inputs of a first and a second multiplier unit, in that an output of the second level detector is coupled to first inputs of a third and fourth multiplier unit, in that the first input of the generator device is coupled to second inputs of the first and the fourth multiplier unit, in that the second input of the generator device is coupled to second inputs of the second and the third multiplier unit, in that an output of the first and the second multiplier unit is coupled to a first and a second input respectively of a first signal-combination unit, an output of the third and the fourth multiplier unit is coupled to a first and a second input respectively of a second signal-combination unit, in that an output of the first and the second signal-combination unit is coupled to a first and a second input respectively of a third signal-combination unit, which unit has an output coupled to the output of the generator device.

2. An arrangement as claimed in claim 1, characterized in that averagers are arranged between the outputs of the first and the second multiplier unit and the inputs of the first signal-combination unit, and in that further averagers are arranged between the outputs of the third and the fourth multiplier unit and the inputs of the second signal-combination unit.

3. An arrangement as claimed in claim 1 or 2, characterized in that the first and the second signal-combination unit are adapted to divide the signal applied to the second input by the signal applied to the first input.

4. An arrangement as claimed in claim 1 or 2 characterized in that the third signal-combination unit is adapted to subtract the signals aplied to its first and its second input from one another.

* * * * *